(12) United States Patent
Hang et al.

(10) Patent No.: US 8,790,550 B2
(45) Date of Patent: Jul. 29, 2014

(54) LOW TEMPERATURE FIREABLE THICK FILM SILVER PASTE

(75) Inventors: Kenneth Warren Hang, Cary, NC (US); Hena Pyada, Cary, NC (US); Howard T Sawhill, Chapel Hill, NC (US); Michael A. Skurski, Cary, NC (US); Robert Paul Waldrop, Chapel Hill, NC (US)

(73) Assignee: E I du Pont de Nemours and Company, Wilmington, DE (US)

( * ) Notice: Subject to any disclaimer, the term of this patent is extended or adjusted under 35 U.S.C. 154(b) by 242 days.

(21) Appl. No.: 13/472,101

(22) Filed: May 15, 2012

(65) Prior Publication Data
US 2012/0305858 A1 Dec. 6, 2012

Related U.S. Application Data

(60) Provisional application No. 61/493,546, filed on Jun. 6, 2011.

(51) Int. Cl.
*H01B 1/16* (2006.01)
*H01B 1/22* (2006.01)
*C03C 8/04* (2006.01)
*C03C 8/18* (2006.01)

(52) U.S. Cl.
CPC .. *H01B 1/16* (2013.01); *C03C 8/04* (2013.01); *C03C 8/18* (2013.01); *H01B 1/22* (2013.01)
USPC ......................................................... 252/514

(58) Field of Classification Search
USPC ...................................................... 252/514
See application file for complete search history.

(56) References Cited

U.S. PATENT DOCUMENTS

| 8,512,463 B2 | 8/2013 | Hang | |
|---|---|---|---|
| 8,551,368 B2* | 10/2013 | Nakamura et al. | 252/514 |
| 2009/0188555 A1 | 7/2009 | Castillo et al. | |
| 2009/0189126 A1 | 7/2009 | Prunchak | |
| 2013/0092884 A1* | 4/2013 | Hang et al. | 252/514 |
| 2013/0099178 A1* | 4/2013 | Hang et al. | 252/514 |
| 2013/0255767 A1* | 10/2013 | Carroll et al. | 136/256 |
| 2013/0284250 A1* | 10/2013 | Hang et al. | 136/256 |

FOREIGN PATENT DOCUMENTS

| EP | 0 463 826 A1 | 1/1992 |
|---|---|---|
| JP | 05128910 A * | 5/1993 |

OTHER PUBLICATIONS

PCT International Search Report.
U.S. Appl. No. 13/438,070, filed Apr. 3, 2012, Hang et al.
U.S. Appl. No. 13/438,124, filed Apr. 26, 2012, Hang et al.

* cited by examiner

*Primary Examiner* — Mark Kopec

(57) ABSTRACT

The present invention is directed to an electroconductive thick film paste composition comprising Ag and a Pb-free bismuth-tellurium oxide both dispersed in an organic medium, wherein the paste is fireable at temperatures below 420° C. The paste is especially useful for forming electrodes on substrates such as glass or films, particularly electrochromic glass or films, that would be damaged by higher firing temperatures. The present invention is further directed to a device comprising an electrode formed from the paste composition and, in particular, to an electrochromic device comprising such an electrode.

10 Claims, No Drawings

LOW TEMPERATURE FIREABLE THICK FILM SILVER PASTE

FIELD OF THE INVENTION

The present invention is directed primarily to a thick film paste composition that is fireable at low temperatures and electrodes formed from the composition.

TECHNICAL BACKGROUND OF THE INVENTION

Light transmission properties of electrochromic films or glasses change with the application of a voltage. The electrochromic material changes from a transparent state to a colored opaque or translucent state. Electrochromic devices are used in a variety of applications. One example of such electrochromic devices are electrochromic smart windows that are used to control the amount of light and heat allowed to pass through. Smart windows can save costs of heating and air-conditioning and provide adjustable lighting. Electrochromic smart windows can be used between rooms to provide walls with different states of light transmission. Electrochromic materials have also been used to tint rear-view mirrors in automobiles and to protect displays under glass in museum cases and picture frames from the damaging effects of ultra-violet and visible light.

Electrodes for applying a voltage are a necessary aspect of electrochromic devices. Current electrochromic materials suffer damage at temperatures above about 420° C. The electrodes must therefore be formed at temperatures below 420° C. There is an on-going need to provide thick film paste compositions that can be fired at temperatures below 420° C. while maintaining electrical performance and other relevant properties of the resulting electrodes and devices. Preferably, the paste is Pb-free. The present invention provides a silver thick film paste composition that simultaneously provides a Pb-free system with lower firing temperatures while maintaining electrical and mechanical performance.

SUMMARY OF THE INVENTION

The present invention provides a thick film paste composition comprising:
(a) 65-85 wt % Ag;
(b) 1-8 wt % Pb-free bismuth-tellurium oxide; and
(c) organic medium;
wherein the Ag and the bismuth-tellurium oxide are dispersed in the organic medium and wherein the wt % are based on the total weight of the paste composition, the bismuth-tellurium oxide comprising 22-42 wt % $Bi_2O_3$ and 58-78 wt % $TeO_2$, based on the total weight of the bismuth-tellurium oxide.

The invention also provides a device, and in particular an electrochromic device, comprising an electrode formed from the instant paste composition, wherein the paste composition has been fired at temperatures below 420° C. to remove the organic medium and form the electrode.

DETAILED DESCRIPTION OF THE INVENTION

The conductive thick film paste composition of the instant invention contains a Pb-free Bi—Te—O that enables paste firing temperatures below 420° C. and provides an electrode that has good electrical and adhesion properties. In one embodiment the Bi—Te—O enables paste firing temperatures not exceeding 405° C. The paste is especially useful for forming electrodes on substrates such as glass or films, particularly electrochromic glass or films, that would be damaged by higher firing temperatures.

The conductive thick film paste composition comprises silver, the bismuth-tellurium oxide that is Pb-free, and an organic vehicle. It can be used to form screen printed electrodes on devices such as electrochromic devices but is also useful in defoggers, refrigerator or freezer windows and any other applications that require low firing thick film paste. The paste composition comprises 65-85 wt % silver, 1-8 wt % bismuth-tellurium oxide and an organic medium, wherein the Ag and the bismuth-tellurium oxide are both dispersed in the organic medium and wherein the weight percentages are based on the total weight of the paste composition.

Each component of the thick film paste composition of the present invention is explained in detail below.

Silver

In the present invention, the conductive phase of the paste is silver (Ag). The silver can be in the form of silver metal, alloys of silver, or mixtures thereof. Typically, the silver particles are in a flake form, a spherical form, a granular form, a crystalline form, a powder, or other irregular forms and mixtures thereof. The silver can be provided in a colloidal suspension. The silver can also be in the form of silver oxide ($Ag_2O$), silver salts such as AgCl, $AgNO_3$, $AgOOCCH_3$ (silver acetate), $AgOOCF_3$ (silver trifluoroacetate), silver orthophosphate ($Ag_3PO_4$), or mixtures thereof. Other forms of silver compatible with the other thick-film paste components can also be used.

In one embodiment, the thick-film paste composition comprises coated silver particles that are electrically conductive. Suitable coatings include phosphorous and surfactants. Suitable surfactants include polyethyleneoxide, polyethyleneglycol, benzotriazole, poly(ethyleneglycol)acetic acid, lauric acid, oleic acid, capric acid, myristic acid, linolic acid, stearic acid, palmitic acid, stearate salts, palmitate salts, and mixtures thereof. The salt counter-ions can be ammonium, sodium, potassium, and mixtures thereof.

The particle size of the silver is not subject to any particular limitation. In one embodiment, an average particle size is less than 10 microns; in another embodiment, the average particle size is less than 5 microns.

The instant thick film paste composition comprises 65-85 wt % silver, based on the total weight of the paste composition. In one embodiment the thick film paste composition comprises 70-80 wt % silver.

Bismuth-Tellurium-Oxide

A component of the paste composition is a lead-free bismuth-tellurium-oxide (Bi—Te—O). In an embodiment, this oxide may be in the form of a glass composition, e.g., a glass frit. In a further embodiment, this oxide may be crystalline, partially crystalline, amorphous, partially amorphous, or combinations thereof. In an embodiment, the Bi—Te—O may include more than one glass composition. In an embodiment, the Bi—Te—O composition may include a glass composition and an additional composition, such as a crystalline composition.

The bismuth-tellurium-oxide (Bi—Te—O) may be prepared by mixing $Bi_2O_3$, $TeO_2$ and other oxides to be incorporated therein (or other materials that decompose into the desired oxides when heated) using techniques understood by one of ordinary skill in the art. Such preparation techniques may involve heating the mixture in air or an oxygen-containing atmosphere to form a melt, quenching the melt, and grinding, milling, and/or screening the quenched material to provide a powder with the desired particle size. Melting the mixture of bismuth, tellurium, and other oxides to be incorporated therein is typically conducted to a peak temperature of 800 to 900° C. The molten mixture can be quenched, for example, on a stainless steel platen or between counter-rotating stainless steel rollers to form a platelet. The resulting platelet can be milled to form a powder. Typically, the milled powder has a $d_{50}$ of 0.1 to 3.0 microns. One skilled in the art of producing glass frit may employ alternative synthesis techniques such as but not limited to water quenching, sol-gel, spray pyrolysis, or others appropriate for making powder forms of glass.

The starting mixture used to make the Bi—Te—O includes, based on the total weight of the starting mixture of the Bi—Te—O, 22 to 42 wt % $Bi_2O_3$ and 58 to 78 wt % $TeO_2$.

In a further embodiment, in addition to the $Bi_2O_3$ and $TeO_2$, the starting mixture used to make the Bi—Te—O includes 0.1 to 7 wt % $Li_2O$ and 0.1 to 4 wt % $TiO_2$, based on the total weight of the starting mixture of the Bi—Te—O. In a still further embodiment, the starting mixture includes 0.1 to 8 wt % $B_2O_3$, 0.1 to 3 wt % ZnO and 0.3 to 2 wt % $P_2O_5$, again based on the total weight of the starting mixture of the Bi—Te—O.

In another embodiment, in addition to the $Bi_2O_3$ and $TeO_2$, the starting mixture used to make the Bi—Te—O includes 0.9 to 5 wt % $Li_2O$ and 0.3 to 2 wt % $TiO_2$, based on the total weight of the starting mixture of the Bi—Te—O. In a yet further embodiment, the starting mixture includes 0.9 to 6 wt % $B_2O_3$, 0.1 to 2 wt % ZnO and 0.3 to 1 wt % $P_2O_5$, again based on the total weight of the starting mixture of the Bi—Te—O.

In one embodiment, the Bi—Te—O may be a homogenous powder. In a further embodiment, the Bi—Te—O may be a combination of more than one powder, wherein each powder may separately be a homogenous population. The composition of the overall combination of the 2 powders is within the ranges described above. For example, the Bi—Te—O may include a combination of 2 or more different powders; separately, these powders may have different compositions, and may or may not be within the ranges described above; however, the combination of these powders is within the ranges described above.

In an embodiment, the Bi—Te—O composition may include one powder which includes a homogenous powder including some but not all of the desired elements of the Bi—Te—O composition, and a second powder, which includes one or more of the other desired elements. For example, a Bi—Te—O composition further comprising Li and Ti may include a first powder including Bi, Te, Li, and O, and a second powder including $TiO_2$. In an aspect of this embodiment, the powders may be melted together to form a uniform composition. In a further aspect of this embodiment, the powders may be added separately to a thick film composition.

In an embodiment, some or all of any $Li_2O$ may be replaced with $Na_2O$, $K_2O$, $Cs_2O$, or $Rb_2O$, resulting in a glass composition with properties similar to the compositions listed above.

Glass compositions, also termed glass frits, are described herein as including percentages of certain components. Specifically, the percentages are the percentages of the components used in the starting material that was subsequently processed as described herein to form a glass composition. Such nomenclature is conventional to one of skill in the art. In other words, the composition contains certain components, and the percentages of those components are expressed as a percentage of the corresponding oxide form. As recognized by one of ordinary skill in the art in glass chemistry, a certain portion of volatile species may be released during the process of making the glass. An example of a volatile species is oxygen. It should also be recognized that while the glass behaves as an amorphous material it will likely contain minor portions of a crystalline material.

If starting with a fired glass, one of ordinary skill in the art may calculate the percentages of starting components described herein using methods known to one of skill in the art including, but not limited to: Inductively Coupled Plasma-Emission Spectroscopy (ICPES), Inductively Coupled Plasma-Atomic Emission Spectroscopy (ICP-AES), and the like. In addition, the following exemplary techniques may be used: X-Ray Fluorescence spectroscopy (XRF); Nuclear Magnetic Resonance spectroscopy (NMR); Electron Paramagnetic Resonance spectroscopy (EPR); Mössbauer spectroscopy; electron microprobe Energy Dispersive Spectroscopy (EDS); electron microprobe Wavelength Dispersive Spectroscopy (WDS); Cathodo-Luminescence (CL).

One of ordinary skill in the art would recognize that the choice of raw materials could unintentionally include impurities that may be incorporated into the glass during processing. For example, the impurities may be present in the range of hundreds to thousands ppm.

The presence of the impurities would not alter the properties of the glass, the thick film composition, or the fired device. For example, a solar cell containing the thick-film composition may have the efficiency described herein, even if the thick-film composition includes impurities.

The content of the Bi—Te—O in the instant thick film paste composition is typically 1-8 wt %, based on the total weight of the thick film paste composition. In one embodiment, the content is 2-7 wt %. The Bi—Te—O is a necessary component of the instant low temperature fireable paste composition but also can play an important role as a component in other such thick film paste formulations.

Organic Medium

The inorganic components of the thick-film paste composition are mixed with an organic medium to form viscous pastes having suitable consistency and rheology for printing. A wide variety of inert viscous materials can be used as the organic medium. The organic medium can be one in which the inorganic components are dispersible with an adequate degree of stability during manufacturing, shipping and storage of the pastes, as well as on the printing screen during the screen-printing process.

Suitable organic media have rheological properties that provide stable dispersion of solids, appropriate viscosity and thixotropy for screen printing, appropriate wettability of the substrate and the paste solids, a good drying rate, and good firing properties. The organic medium can contain thickeners, stabilizers, surfactants, and/or other common additives. One such thixotropic thickener is thixatrol. The organic medium can be a solution of polymer(s) in solvent(s). Suitable polymers include ethyl cellulose, ethylhydroxyethyl cellulose, wood rosin, mixtures of ethyl cellulose and phenolic resins, polymethacrylates of lower alcohols, and the monobutyl ether of ethylene glycol monoacetate. Suitable solvents include terpenes such as alpha- or beta-terpineol or mixtures thereof with other solvents such as kerosene, dibutylphthalate, butyl carbitol, butyl carbitol acetate, hexylene glycol and alcohols with boiling points above 150° C., and alcohol esters. Other suitable organic medium components include: bis(2-(2-butoxyethoxy)ethyl adipate, dibasic esters such as DBE, DBE-2, DBE-3, DBE-4, DBE-5, DBE-6, DBE-9, and DBE 1B, octyl epoxy tallate, isotetradecanol, and pentaerythritol ester of hydrogenated rosin. The organic medium can also comprise volatile liquids to promote rapid hardening after application of the thick-film paste composition on a substrate.

The optimal amount of organic medium in the thick-film paste composition is dependent on the method of applying the paste and the specific organic medium used. The instant thick-film paste composition contains 10 to 30 wt % of organic medium, based on the total weight of the paste composition.

If the organic medium comprises a polymer, the polymer typically comprises 8 to 15 wt % of the organic composition.

Preparation of the Thick Film Paste Composition

In one embodiment, the thick film paste composition can be prepared by mixing Ag powder, the Bi—Te—O powder, the organic medium and any other component, e.g., additional glass frit, in any order. In some embodiments, the inorganic materials are mixed first, and they are then added to the organic medium, In other embodiments, the Ag powder which is the major portion of the inorganics is slowly added to the organic medium. The viscosity is typically in the range of 60 to 75 Pas. The viscosity can be adjusted, if needed, by the addition of solvents. Mixing methods that provide high shear are useful.

Electrode-Forming Process

The thick film paste composition can be deposited by screen-printing, plating, extrusion, inkjet, shaped or multiple printing, or ribbons.

In this electrode-forming process, the thick film paste composition is deposited, e.g., by screen printing, and dried. It is then heated at temperatures below 420° C. to remove the organic medium and sinter the inorganic materials, thereby forming the desired electrode. The heating can be carried out in air or an oxygen-containing atmosphere. This step is commonly referred to as "firing." The firing temperature profile is typically set so as to enable the burnout of organic binder materials from the dried thick film paste composition, as well as any other organic materials present. In one embodiment, the firing temperature is below 420° C. In another embodiment, the firing temperature does not exceed 405° C. The firing can be conducted in a belt furnace. Multiple temperature zones, for example 3 to 11 zones, can be used to control the desired thermal profile.

The electrodes formed using the thick film paste composition of the invention have resistivities in the range of 2-5 mOhm/sq/25 μm.

EXAMPLES

Example 1

Bismuth-Tellurium-Oxide Preparation

A bismuth-tellurium-oxide (Bi—Te—O) composition was prepared by mixing and blending $Bi_2O_3$, $TeO_2$, $Li_2CO_3$, $TiO_2$, $B_2O_3$, $BPO_4$ (or $LiPO_3$) and ZnO powders to result in a Bi—Te—O glass frit composition comprising 26.64 wt % $Bi_2O_3$, 67.22 wt % $TeO_2$, 2.16 wt % $LiO_2$, 0.48 wt % $TiO_2$, 2.09 wt % $B_2O_3$, 0.98 wt % ZnO and 0.43 wt % $P_2O_5$. The blended powder batch materials were loaded to a platinum alloy crucible then inserted into a furnace and heated at 900° C. in air or $O_2$ for one hour to melt the mixture. The liquid melt was quenched from 900° C. by removing the platinum crucible from the furnace and pouring the melt through counter rotating a stainless steel rollers gapped to 0.010-0.020. The resulting material was coarsely crushed in a stainless steel container. The crushed material was then ball-milled in an alumina-silicate ceramic ball mill with zirconia media and water until the $D_{50}$ was 0.5-0.7 microns. The ball-milled material was then separated from the milling balls, wet screened and dried by hot air oven. The dried powder was run through a 200 mesh screen to provide the Bi—Te—O powder used in the thick film paste preparations described below.

X-ray analysis of the powder showed a characteristic of an amorphous material. The material was characterized by Thermo-mechanical Analysis (TMA) and shows an onset of particle sintering at 320° C. which transitions to fully viscous flow at 353° C. The liquidus for the composition appears to be near 511° C. (between 320° C. and 511° C. some crystalline phases may be transiently formed and re-dissolved in the region between sintering onset and the liquidus temperature).

Thick Film Paste Composition Preparation

The thick film paste was prepared by mixing Ag, the Bi—Te—O glass frit powder as described above in Example 1 and the organic medium. The Ag used was a coated silver flake powder (available from Ferro Electronic Material Systems, Vista, Calif.) with a $d_{50}$ of 0.4-0.8 μm. The proportions of ingredients used in this Example were 70.3 parts by weight Ag, 5.2 parts by weight Bi—Te—O and an organic medium with 14.5 parts by weight of ethyl cellulose resin dissolved in a beta terpineol solvent and 3 parts by weight beta terpineol for a total of 93 parts by weight.

The Bi—Te—O was added to the organic medium with continued stirring followed by the addition of the Ag. Since the silver was the major portion of the solids it was added slowly to insure better wetting. The paste was then passed through a three-roll mill at a 1 mil gap several times. The degree of dispersion was measured by fine of grind (FOG) to insure that the FOG was less than or equal to 20/10. The FOG was 11/5 and the viscosity was 65 Pas.

Test Electrode

The paste composition was screen printed onto a glass slide in a serpentine pattern. The paste was dried and then fired in air in a 11-zone belt furnace at temperatures not exceeding 405° C. The firing temperature profile extended over about 30 minutes. The sample was at temperatures above 400° C. for 3.17 minutes. The temperature never exceeded 405° C. The fired sample had a thickness of 13.4 μm and the average value of resistivity measurements was 2.4641 mOhm/sq/25 μm.

Adhesion was measured by a cross hatch test based on ASTM D-3359-78. On a scale of 1 to 5 with 5 representing no material removal, i.e., excellent adhesion, the adhesion was rated at 5.

Example 2

Example 2 was carried out as described in Example 1 except that the paste was prepared using 3.2 parts by weight Bi—Te—O, 1.4 parts by weight of a glass frit containing 69.82 wt % $Bi_2O_3$, 12.03 wt % ZnO, 8.38 wt % $B_2O_3$, 7.11 wt % $SiO_2$, 2.13 wt % $Al_2O_3$ and 0.53 wt % CaO, and 0.6 parts by weight of a glass frit containing 1.2375 wt % $SiO_2$, 19.7999 wt % $Al_2O_3$, 6.8062 wt % $B_2O_3$, 9.8072 wt % $Na_2O$, 3.7125 wt % $Li_2O$, 16.4071 wt % NaF and 42.2296 wt % $P_2O_5$, instead of the 5.2 parts by weight Bi—Te—O used in Example 1. Again the total parts by weight was 93.

The FOG of the resulting paste was 12/5 and the viscosity was 73 Pas.

The fired sample had a thickness of 14 μm and the average value of resistivity measurements was 2.3358 mOhm/sq/25 μm.

The adhesion was rated at 5.

What is claimed is:

1. A thick film paste composition comprising:
   (a) 65-85 wt % Ag;
   (b) 1-8 wt % Pb-free bismuth-tellurium-oxide consisting of 22-42 wt % $Bi_2O_3$, 58-78 wt % $TeO_2$, 0.1-7 wt % $Li_2O$ and 0.1-4 wt % $TiO_2$, wherein the wt % of $Bi_2O_3$, $TeO_2$, $Li_2O$ and $TiO_2$ are based on the total weight of said bismuth-tellurium oxide; and (c) an organic medium;
wherein said Ag, and said bismuth-tellurium-oxide are dispersed in said organic medium and wherein said wt % of said Ag and said bismuth-tellurium-oxide are based on the total weight of said paste composition.

2. The paste composition of claim 1 comprising 70-80 wt % Ag and 2-7 wt % bismuth-tellurium oxide, wherein said wt % are based on the total weight of said paste composition.

3. The paste composition of claim 1, said bismuth-tellurium-oxide consisting of 22-42 wt % $Bi_2O_3$, 58-78 wt % $TeO_2$, 0.9-5 wt % $Li_2O$ and 0.3-2 wt % $TiO_2$, based on the total weight of said bismuth-tellurium oxide.

4. A thick film paste composition comprising:
(a) 65-85 wt % Ag;
(b) 1-8 wt % Pb-free bismuth-tellurium-oxide consisting of 22-42 wt % $Bi_2O_3$, 58-78 wt % $TeO_2$, 0.1-7 wt % $Li_2O$, 0.1-4 wt % $TiO_2$, 0.1-8 wt % $B_2O_3$, 0.1-3 wt % ZnO and 0.3-2 wt % $P_2O_5$, wherein the wt % of $Bi_2O_3$, $TeO_2$, $Li_2O$, $TiO_2$, $B_2O_3$, ZnO and $P_2O_5$ are based on the total weight of said bismuth-tellurium oxide; and
(c) an organic medium;
wherein said Ag and said bismuth-tellurium-oxide are dispersed in said organic medium and wherein said wt % of said Ag and said bismuth-tellurium-oxide are based on the total weight of said paste composition.

5. The paste composition of claim 4, said bismuth-tellurium-oxide consisting of 22-42 wt % $Bi_2O_3$, 58-78 wt % $TeO_2$, 0.9-5 wt % $Li_2O$, 0.3-2 wt % $TiO_2$, 09-6 wt % $B_2O_3$, 0.1-2 wt % ZnO and 0.3-1 wt % $P_2O_5$, based on the total weight of said bismuth-tellurium oxide.

6. The paste composition of any of claims 1, 2 or 3-5 wherein said bismuth-tellurium oxide is in the form of a glass frit.

7. A device comprising an electrode formed from the paste composition of claims 1, 2 or 3-5, wherein said paste composition has been fired at temperatures below 420° C. to remove the organic medium and form said electrode.

8. The device of claim 7, wherein said device is an electrochromic device.

9. The device of claim 8, wherein said paste composition has been fired at temperatures not exceeding 405° C. to remove the organic medium and form said electrode.

10. The device of claim 7, wherein said paste composition has been fired at temperatures not exceeding 405° C. to remove the organic medium and form said electrode.

* * * * *

UNITED STATES PATENT AND TRADEMARK OFFICE
CERTIFICATE OF CORRECTION

| | | |
|---|---|---|
| PATENT NO. | : 8,790,550 B2 | Page 1 of 1 |
| APPLICATION NO. | : 13/472101 | |
| DATED | : July 29, 2014 | |
| INVENTOR(S) | : Kenneth Warren Hang et al. | |

It is certified that error appears in the above-identified patent and that said Letters Patent is hereby corrected as shown below:

In the Claims

Column 8, Line 5, (Claim 5) change "09-6 wt% $B_2O_3$" to read -- 0.9-6 wt% $B_2O_3$ --

Signed and Sealed this
Second Day of December, 2014

Michelle K. Lee
*Deputy Director of the United States Patent and Trademark Office*